United States Patent
Higley

[15] 3,644,202
[45] Feb. 22, 1972

[54] COLLAGEN MEMBRANES FOR REVERSE OSMOSIS DESALINATION

[72] Inventor: Willard S. Higley, 837 Huerte Verde Road, Glendora, Calif. 91740

[22] Filed: Mar. 31, 1970

[21] Appl. No.: 24,337

[52] U.S. Cl. ............................................. 210/23, 210/503
[51] Int. Cl. .......................................................... B01d 13/00
[58] Field of Search ..................... 210/22, 23, 321, 500, 503; 264/41, 49

[56] References Cited

UNITED STATES PATENTS

| | | | |
|---|---|---|---|
| 3,331,772 | 7/1967 | Brownscombe et al. | 210/22 X |
| 3,228,876 | 1/1966 | Mahon | 210/22 |
| 3,462,362 | 8/1969 | Kollsman | 210/321 X |
| 3,413,219 | 11/1968 | Kraus et al. | 210/500 X |
| 3,567,666 | 3/1971 | Benzer | 210/503 |
| 3,472,766 | 10/1969 | Rosenbaum | 210/500 X |
| 3,131,433 | 4/1904 | Fexrani | 210/321 X |
| 3,423,491 | 1/1969 | McLain et al. | 210/321 X |

OTHER PUBLICATIONS

U.S. Saline Wakes Conversion Report 1968, U.S. Office of Saline Water, June 5, 1969 pp. 123 & 124.
Transactions— American Society for Artificial Organs, Vol. XIII, Nishihan et al., June 16, 1967, pp. 243– 247.
Transactions— American Society for Artificial Internal Organs Vol. XIV, Rubin et al. June 14, 1968, pp. 69– 174.

*Primary Examiner*—Reuben Friedman
*Assistant Examiner*—Richard Barnes
*Attorney*—Ernest S. Cohen and William S. Brown

[57] ABSTRACT

A collagen membrane is employed as reverse osmosis membrane in desalination of water. The process is particularly applicable to desalination of brackish waters containing substantial amounts of divalent ions.

5 Claims, No Drawings

COLLAGEN MEMBRANES FOR REVERSE OSMOSIS DESALINATION

Reverse osmosis has attracted considerable interest in the field of purification of saline water. In this process, a pressure in excess of the osmotic pressure of the sale water feed solution is applied to the solution separated from purified water by a semipermeable membrane. Pure water is thereby caused to diffuse through the membrane, while the salt molecules or other impurities are retained by the membrane.

Efficiency of the reverse osmosis process depends to a large extend on the nature of the semipermeable membrane and numerous types of membranes have been described in the prior art. Among the more effective of these has been the cellulose acetate membranes described, e.g., in U.S. Pat. Nos. 3,133,132; 3,133,137 and 3,439,074. These prior art membranes are cast from solutions comprising the membrane material and an organic solvent, with or without additional solution components such as water, swelling agents, etc. The membranes may be employed in the reverse osmosis process in the form of a free film or a film deposited on a porous support material.

It has now been found that a membrane consisting essentially of collagen is an effective semipermeable membrane for use in reverse osmosis processes, particularly where high flux and moderate salt retention are desired. These membranes are particularly well suited to desalination of brackish waters containing substantial amounts of divalent ions, e.g., magnesium or calcium. The membranes of the invention are cast from colloidal dispersions, as distinct from the prior art membranes which, as discussed above, are cast from solutions. In addition, the membranes of the invention are essentially isotropic in structure, in contrast to the asymmetric cellulose acetate membranes of the prior art. The collagen membranes of the invention are, however, characterized by high absorption of water, resulting in high flux of product water through the membrane under conditions of reverse osmosis operation.

The membranes of the invention are preferably prepared from a microcrystalline form of collagen, i.e., collagen in which the average crystal size is less than about $1\mu$. Colloidal casting dispersions of the collagen, preferably in concentrations of about 0.25 to 1.0 percent by weight, are prepared by dispersing the collagen in a mixture of water and an organic solvent such as methanol, ethanol, isopropanol or acetone.

Since the cast collagen films are adhesive in nature it may be desirable to employ casting surfaces that permit ready release of the dried films. Suitable surfaces of this type are wax-extended polyethylene sheeting and silicone release paper. The membrane may, however, be cast directly on a suitable support such as a filter material.

Cross-linking of the collagen films is usually desirable in order to provide sufficient wet strength. This may be achieved by either thermal or chemical means or a combination of the two. Drying the wet membrane overnight at about 35°–50° C., followed by heat treatment at a temperature of about 110° to 150° C. for about 2 to 6 hours has been found to give good results. Addition of a cross-linking agent such as hexamethoxymethylmelamine to the casting solution in an amount of about 0.06 percent, and subsequent heat treatment of about 110° to 150° C., also gives a film having good strength and desalination properties. Examples of other suitable cross-linking agents are glyoxal, quinone and chrome alum. Optimum treatment conditions for a given cross-linking agent are best determined experimentally.

The collagen membranes of the invention have the additional advantage that they may be deposited on porous substrates having an average pore size less than the average particle size of the dispersed colloidal collagen particle. Examples of suitable substrates are Metrical filters of about 2,000 A. average pore size. These filters consist of cellulose triacetate and are manufactured by Gelman Instrument Company, Ann Arbor, Mich.

The following example will serve to more particularly illustrate the invention.

EXAMPLE 1

A casting dispersion was prepared by dispersion 0.64 wt. % of 113 H, a microcrystalline collagen (crystal size $>1\mu$) in a 1/1 (wt./wt.) solution of water—methanol in a Waring Blender. Avitene H, developed by Food Machinery Corporation, Princeton, N.J. is prepared from bovine hide collagen by a process described in Journal of Applied Polymer Science, 11, 481, (1967). Collagen and water—methanol mixtures were charged to the blender, allowed to soak for 5 minutes, and blended for 5 minutes at a transformer setting of 35 v., followed by 10–15 minutes at a setting of 90 v. The resulting dispersion was filtered through a 70×100 fiber count/in. nylon parchment and cast in the form of a film 100 mils thick on a wax-extended polyethylene sheeting taped to glass.

The film was dried overnight at 47° C. and then heat-treated at 150° C. for 6 hours to effect cross-linking. Three circles of the film were water-wet and mounted on No. 50 Whatman filter paper in a reverse-osmosis unit and tested at 800 p.s.i. using 10,000 p.p.m. magnesium sulfate feed solution. The 1.45 mil wet-thick film held up well with actual fluxes of 5.0 to 5.2 gfd. and 74.4 to 75.4 percent magnesium sulfate rejection. A limited life study was continued by allowing the film to stand in contact with the feed solution for 24 hours after the initial shutdown. It was then restarted, run for an addition 1.6 hr., and shut down for 72 hr. and then restarted again. Over this period, the actual flux increased slightly to 5.8 gfd. and the magnesium sulfate retention fell to 69.3 percent, indicating only a slight deterioration of reverse-osmosis properties. The calculated fluxes of the collagen membranes based on wet thickness of 2,500 A. ranged from 734 to 822 gfd. with magnesium sulfate rejections of 69.3 to 75.4 percent over the same time range. Cellulose acetate membranes of the same wet thickness would give only 10 to 12 gfd. under similar conditions. Thus, the high fluxes demonstrated for collagen membranes make them unique for magnesium sulfate desalination.

EXAMPLE 2

Collagen films were cast on solvent-wet Metricel filters of 2,000 and 75 A. average pore size to give a membrane consisting of a collagen film bonded to the surface of the supporting filter. Collagen casting dispersions (0.64 percent microcrystalline collagen with 0.056 percent hexamethoxymethylmelamine cross-linking agent) in a 1:1 water-methanol mixture were cast on the solvent (1:1 water-methanol) filled Metricel filters followed by air drying and heat treatment at 150° C. for 6 hours. The composite membranes were tested in a reverse osmosis cell at 800 p.s.i. pressure with 1.0 percent sodium chloride feed solution. The details are presented in Table 1.

The above composite membranes would be expected to give much higher retentions using a brackish water feed solution containing a preponderance of covalent ions such as $Ca^{++}$ and $Mg^{++}$.

TABLE 1

| Cast wet thickness, mils | Dried film thickness, mils | Filter pore size, A. | Operation hours | Actual flux, gf. | Calculated flux (2,500 A. thick) Dry | Calculated flux (2,500 A. thick) Wet | Salt retention T percent |
|---|---|---|---|---|---|---|---|
| 50 | 6.1 | 2,000 | 0.50 | 9.3–9.7 | 228, 236 | 290, 299 | 27.7, 24.8 |
|  |  |  | 0.95 | 9.6–9.8 | 234, 238 | 297, 302 | 24.7, 22.5 |
|  |  |  | 1.30 | 9.7–10.0 | 237, 244 | 301, 308 | 28.5, 26.2 |
|  |  |  | 3.10 | 9.3–9.7 | 228, 236 | 290, 299 | 25.4, 23.9 |
| 30 | 3.65 | 75 | 3.10 | 0.27 | 4.0 | 5.1 | 79.4 |

What is claimed is:

1. A process for desalination of brackish water containing substantial amounts of magnesium or calcium ions by reverse osmosis comprising contacting the brackish water under pressure in excess of the osmotic pressure of the magnesium or calcium ions in solution in the brackish water with a reverse osmosis membrane consisting essentially of a collagen membrane prepared by colloidally dispersing microcrystalline collagen in a mixture of water and organic solvent, followed by casting to form a film.

2. The process of claim 1 in which the collagen membrane is deposited on a porous support.

3. The process of claim 1 in which the collagen membrane is formed by subjecting a collagen film to a thermal or chemical treatment to effect cross-linking.

4. The process of claim 3 in which the cross-linking is effected by means of heat treatment at a temperature of about 110° to 150° C.

5. The process of claim 4 in which chemical cross-linking is effected by inclusion of a cross-linking agent in the dispersion used to form the collagen film.

* * * * *